United States Patent
Fourney et al.

(10) Patent No.: US 11,386,105 B2
(45) Date of Patent: Jul. 12, 2022

(54) AUTOMATIC IDENTIFICATION AND CONTEXTUAL REFORMULATION OF IMPLICIT DEVICE-RELATED QUERIES

(71) Applicant: Microsoft Technology Licensing, LLC, Redmond, WA (US)

(72) Inventors: Adam Fourney, Redmond, WA (US); Susan T. Dumais, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 819 days.

(21) Appl. No.: 15/142,984

(22) Filed: Apr. 29, 2016

(65) Prior Publication Data
US 2017/0316065 A1     Nov. 2, 2017

(51) Int. Cl.
*G06F 16/24*     (2019.01)
*G06F 16/248*    (2019.01)
(Continued)

(52) U.S. Cl.
CPC ........ *G06F 16/248* (2019.01); *G06F 16/2425* (2019.01); *G06F 16/9535* (2019.01)

(58) Field of Classification Search
CPC ........ G06F 17/30554; G06F 17/30395; G06F 17/30867; G06F 17/30646;
(Continued)

(56) References Cited

U.S. PATENT DOCUMENTS 6,829,599 B2   12/2004   Chidlovskii
7,225,187 B2    5/2007   Dumais et al.
(Continued)

FOREIGN PATENT DOCUMENTS

WO   WO2015001048   1/2015
WO   WO2015086493   6/2015

OTHER PUBLICATIONS

"International Search Report and Written Opinion Issued in PCT Application No. PCT/US2017/029229", dated Jun. 16, 2017, 13 Pages.
(Continued)

*Primary Examiner* — Hares Jami
(74) *Attorney, Agent, or Firm* — Schwegman Lundberg & Woessner, P.A.

(57) ABSTRACT

System and methods for performing automatic identification and contextual reformulation of implicit device-related queries are described. In some examples, a query server may receive a query from an electronic device, receive data associated with the electronic device, determine that the query is related to the electronic device, generate a new query based at least in part on the query and the data associated with the electronic device, retrieve results related to the new query, and send the results related to the new query to the electronic device. In some examples, determining that the query is related to the electronic device includes determining that the query is a semi-implicit device query or a fully implicit device query. The data associated with the electronic device can include a model name of the electronic device, an operating platform for the electronic device, and/or additional data related to the electronic device.

14 Claims, 8 Drawing Sheets

(51) Int. Cl.
*G06F 16/242* (2019.01)
*G06F 16/9535* (2019.01)

(58) Field of Classification Search
CPC ............. G06F 17/30448; G06F 16/248; G06F 16/2425; G06F 16/9535; G06F 16/24575; G06F 16/3325
USPC .......................................... 707/722, 759–768
See application file for complete search history.

(56) References Cited

U.S. PATENT DOCUMENTS

| | | | |
|---|---|---|---|
| 7,840,556 B1* | 11/2010 | Dayal | G06F 17/30442 707/721 |
| 7,953,746 B1 | 5/2011 | Garg et al. | |
| 8,478,773 B1* | 7/2013 | Bryukhov | G06F 17/30867 705/14.49 |
| 8,731,942 B2 | 5/2014 | Cheyer et al. | |
| 9,009,085 B2 | 4/2015 | Boyle et al. | |
| 9,104,750 B1 | 8/2015 | Dhamdhere et al. | |
| 2006/0271520 A1 | 11/2006 | Ragan | |
| 2008/0077558 A1* | 3/2008 | Lawrence | G06F 17/30867 |
| 2008/0114721 A1* | 5/2008 | Jones | G06F 17/30672 |
| 2009/0030800 A1 | 1/2009 | Grois | |
| 2011/0264656 A1* | 10/2011 | Dumais | G06F 17/3087 707/728 |
| 2012/0233140 A1 | 9/2012 | Collins-Thompson et al. | |
| 2012/0330925 A1* | 12/2012 | Ramamurthy | G06F 17/30448 707/718 |
| 2013/0031476 A1 | 1/2013 | Coin et al. | |
| 2013/0282754 A1* | 10/2013 | Son | G06F 16/2455 707/769 |
| 2014/0074483 A1 | 3/2014 | van Os | |
| 2014/0114944 A1* | 4/2014 | Luk | G06F 17/30616 707/706 |
| 2014/0245140 A1 | 8/2014 | Brown et al. | |
| 2015/0227940 A1* | 8/2015 | Brunet | G06Q 30/016 705/304 |
| 2015/0363485 A1 | 12/2015 | Bennett et al. | |
| 2016/0125096 A1* | 5/2016 | Haverlock | G06F 16/90328 707/722 |
| 2017/0199882 A1* | 7/2017 | Byron | G06F 17/3071 |

OTHER PUBLICATIONS

"Do things quickly with Tell Me", Retrieved From: https://support.office.com/en-us/article/do-things-quickly-with-tell-me-f20d2198-17b8-4b09-a3e5-007a337f1e4e, Retrieved on: Apr. 15, 2016, 5 Pages.

"Get Started with Windows 10", Retrieved on: https://web.archive.org/web/20160319132554/http://windows.microsoft.com/en-us/windows-10/getstarted-search-for-anything-cortana, Retrieved on: Mar. 19, 2016, 2 Pages.

"iOS—Siri—Apple", Retrieved From: https://web.archive.org/web/20160308022255/https://www.apple.com/in/ios/siri/, Retrieved on: Mar. 8, 2016, 4 Pages.

Bennett, et al., "Modeling the Impact of Short- and Long-Term Behavior on Search Personalization", in Proceedings of the 35th Annual ACM SIGIR Conference on Research and Development in Information Retrieval, Aug. 12, 2012, pp. 185-194.

"Teneo Virtual Assistant", Retrieved From: https://www.artificial-solutions.com/wp-content/uploads/2012/11/ds-teneo-virtual-assistant.pdf, Retrieved on: Mar. 9, 2016, 4 Pages.

"Top Virtual Assisstant Companies and a Head-to-Head Product Comparision", Retrieved From: https://www.technavio.com/blog/top-virtual-assistant-companies-and-a-head-to-head-product-comparison, May 8, 2014, 12 Pages.

"What can I say to Cortana?", Retrieved From: https://web.archive.org/web/20160315040930/http://www.windowsphone.com/en-us/how-to/wp8/cortana/what-can-i-say-to-cortana, Retrieved on: Mar. 15, 2016, 4 Pages.

Eisman, et al., "Intellgent Web Navigation Using Virtual Assistants", in the 7th International Conference on Intelligent Techniques for Web Personalization & Recommender Systems, vol. 528, Jul. 11, 2009, pp. 53-58.

Ekstrand, et al., "Searching for Software Learning Resources Using Application Context", in the Proceedings of the 24th Annual ACM Symposium on User interface Software and Technology, Oct. 16, 2011, pp. 195-204.

Gravano, et al., "Categorizing Web Queries According to Geographical Locality", in Proceedings of the Twelve International Conference on Information and Knowledge Management, Nov. 3, 2003, pp. 325-333.

Jones, et al., "Generating Query Substitutions.", in Proceedings of the 15th International Conference on World Wide Web., May 23, 2006, pp. 387-396.

Tur, et al., "Detecting Out-of-Domain Utterances Addressed to a Virtual Personal Assistant", in 15th Annual Conference of the International Speech Communication Association, Sep. 14, 2014, 5 Pages.

Welch, et al., "Automatically Identifying Localizable Queries", in Proceedings of the 31st annual International ACM SIGIR Conference on Research and Development in Information Retrieval, Jul. 20, 2008, pp. 507-514.

Wen, et al., "Probabilistic Model for Contextual Retrieval", in Proceedings of the 27th Annual International ACM SIGIR Conference on Research and Development in Information Retrieval, Jul. 25, 2004, pp. 57-63.

* cited by examiner

AUTOMATIC IDENTIFICATION AND CONTEXTUAL REFORMULATION OF IMPLICIT DEVICE-RELATED QUERIES

BACKGROUND

When performing a web search on an electronic device, a user often provides a query that is short and underspecified. To compensate for an underspecified query, a web search engine may consider the context in which the query arises in order to perform a more specific web search that is tailored to the user's needs. For instance, the web search engine can provide search results that are geographically relevant to the user when the user performs a web search that is related to a local establishment such as a restaurant, or store.

However, web search engines are increasingly fielding queries from a range of new environments and contexts. For instance, web search engines are receiving queries posed from search boxes integrated directly into operating systems and desktop applications, as well as queries posed to virtual assistants. In these environments, many queries implicitly pertain to the systems, platforms or devices from which they originate. When receiving such queries, web search engines lack the context necessary to provide the most relevant results. As such, a user is required to perform multiple searches using various queries in order to receive search results that may be relevant to the user.

SUMMARY

This disclosure describes techniques for performing automatic identification and contextual reformulation of implicit device-related queries. In some examples, a system can receive a query from the electronic device via a network. In response, the system can determine that the query relates to the electronic device. For instance, the system can determine that the query is a semi-implicit device query and/or a fully implicit device query. Based on the query being related to the electronic device, the system can generate a new query that is based on the query and data associated with the electronic device.

Using the new query, the system can perform a search in order to retrieve search results that are relevant to the electronic device. For instance, in some examples, the system can search the World Wide Web using the new query to retrieve information (e.g., web pages, images, or other types of files) that is related to the new query. Additionally or alternatively, in some examples, the system can mine data available in databases and/or directories, retrieving information that is related to the new query. The system can then send the search results to the electronic device via the network.

In some examples, by reformulating queries, the system (e.g., search engine) is more effective in retrieving relevant results than previous search engines. For instance, in some examples, search results that are irrelevant to a query that is provided by a user do not appear by the system performing the search using the new query. Additionally, in some examples, the system is able to provide the electronic device with relevant search results using a single query, which differs from previous search engines that may require multiple queries to provide relevant search results to the electronic device. Furthermore, in some examples, the system can directly answer the query (e.g., with a single link or short answer, voice synthesized output, or the like) without providing the electronic device with unnecessary search results. This is because the system generates a new query that is more relevant to the electronic device before performing the search.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
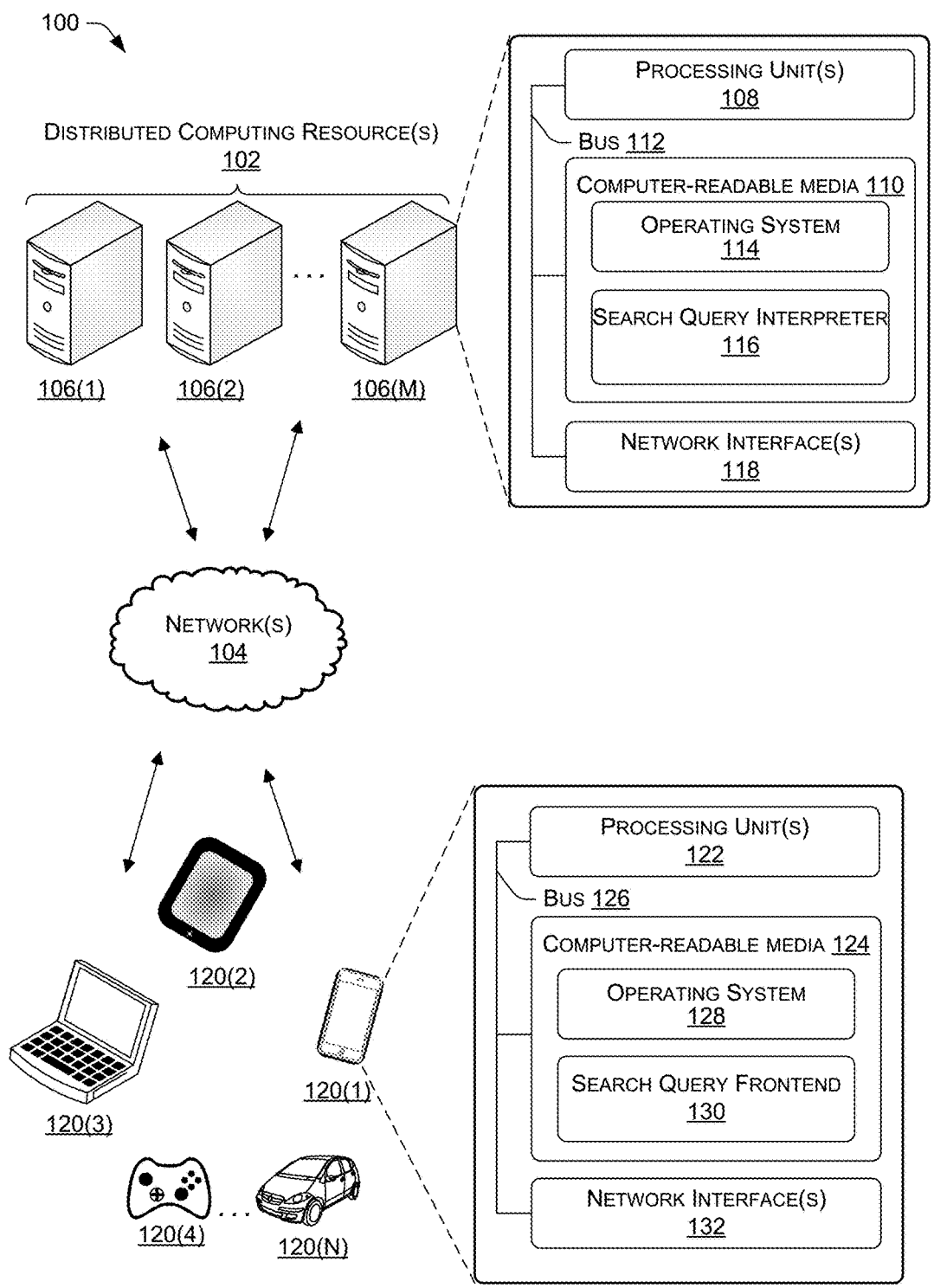
FIG. 1 is a block diagram illustrating an example environment in which automatic identification and contextual reformulation of implicit device-related queries can operate.

Examples described herein provide techniques for performing automatic identification and contextual reformulation of implicit device-related queries. In some examples, a system can receive a query from an electronic device via a network. In some examples, the query can correspond to web search text that includes plaintext and/or hypertext with optional search-directives. Additionally or alternatively, in some examples, the query can include an audio signal captured by the electronic device (e.g., a query spoken by a user), an image, or other types of queries that the system can receive from the electronic device. In some examples, the system can further receive data associated with the electronic device from the electronic device via the network. The data associated with the electronic device can include information related to the electronic device, such as any hardware data, software data, and/or characteristic data associated with the electronic device. For instance, the data can include a model name of the electronic device, an operating platform of the electronic device, a network (e.g., wireless carrier) associated with the electronic device, a representation of the electronic device's configuration settings, a manifest of installed software on the electronic device, physical characteristics of the electronic device (e.g., the color, screen size, et.), or the like.

In some examples, based on receiving the query and the data, the system can determine whether the query is related to the electronic device. For instance, the system can determine whether the query is a semi-implicit device query or a fully implicit device query. If the system determines the query is not related to the electronic device, then the system can perform a search using the query. However, if the system determines that the query is related to the electronic device, the system can alter a retrieval (e.g., search) strategy that the server uses to retrieve search results using the query and the data associated with the electronic device. For instance, in some examples, the server can generate a new query that is based on the query and the data related to the electronic device. In some examples, generating the new query includes replacing an indicator phrase included within the query with the information related to the electronic device. Additionally or alternatively, in some examples, generating the new query can include adding the information related to the electronic device to the query.

Using the new query, the system can perform a search in order to retrieve search results that are relevant to the electronic device. For instance, in some examples, the system can search the World Wide Web using the new query to retrieve information (e.g., web pages, images, or other types of files) that is related to the new query. Additionally or alternatively, in some examples, the system can mine data available in databases and/or directories using the new query to retrieve the information related to the new query. The system can then provide the electronic device with the search results.

It should be noted that, in some examples, the server can alter the retrieval (e.g., search) strategy by incorporating the data associated with the device with the query when performing the search. For instance, the server can perform a search using the query in order to retrieve search results. The server can then re-rank the search results using the data associated with the electronic device in order to identify search results that are relevant to the electronic device. For instance, the server can use the data to re-rank search results (e.g., web pages) based on how frequently the search results selected by electronic devices that are similar to the electronic device. In some examples, the similar electronic devices include the same model as the electronic device, operating platform as the electronic device, configuration settings as the electronic device, wireless carrier as the electronic device, and/or installed software applications as the electronic device. The server can then provide the electronic device with the identified search results.

It should further be noted that, in some examples, the electronic device can determine whether the query is related to the electronic device. In such examples, the electronic device can generate the new query based on the query and the data associated with the electronic device. The electronic device can then send the new query to the system, and receive the search results from the system via the network. In some examples, the electronic device can display the search results to the user via a display device. Additionally or alternatively, in some examples, the electronic device can output the search results via one or more speakers.

Various examples, scenarios, and aspects are described further with reference to FIGS. 1-8.

ILLUSTRATIVE ENVIRONMENT

FIG. 1 shows an example environment 100 in which examples of automatic identification and contextual reformulation of implicit device-related queries can operate. In some examples, the various devices and/or components of environment 100 include distributed computing resources 102 that can communicate with one another and with external devices via one or more networks 104.

Network(s) 104 can include, for example, public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(M). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as a single type of device, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, Internet of Things (IoT) devices, work stations, media players, personal video recorders (PVRs), set-top boxes, cameras, integrated components (i.e., peripheral devices) for inclusion in a computing device, appliances, or any other sort of computing device.

Device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, search query interpreter 116, and other modules, programs, or applications that are loadable and executable by processing units(s) 108. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU embedded in an FPGA fabric.

Device(s) 106 can also include one or more network interfaces 118 to enable communications between computing device(s) 106 and other networked devices such as client computing device(s) 120. Such network interface(s) 118 can include one or more network interface controllers (NICs) or other types of transceiver devices to send and receive communications over a network. For simplicity, other components are omitted from the illustrated device(s) 106.

Other devices configured to implement automatic identification and contextual reformulation of implicit device-related queries can include client computing devices, for example one or more of client computing devices 120(1)-120(N). Client computing device(s) 120 can belong to a variety of categories or classes of devices, which can be the same as, or different from, device(s) 106, such as traditional client-type devices, desktop computer-type devices, mobile-type devices, special purpose-type devices, embedded-type devices, and/or wearable-type devices. Client computing device(s) 120 can include, but are not limited to, telecommunication devices such as a mobile phone 120(1), a tablet computer 120(2), a laptop computer 120(3), computer navigation type client computing devices such as satellite-based navigation systems including global positioning system (GPS) devices and other satellite-based navigation system devices, a mobile phone/tablet hybrid, a personal data assistant (PDA), a personal computer, other mobile computers, wearable computers, implanted computing devices, desktop computers, automotive computers, network-enabled televisions, thin clients, terminals, game consoles, gaming devices 120(4), Internet of Things (IoT) devices 120(N), work stations, media players, personal video recorders (PVRs), set-top boxes, cameras, integrated components (e.g., peripheral devices) for inclusion in a computing device, appliances, or any other sort of computing device.

Client computing device(s) 120 of the various categories or classes and device types, such as the mobile phone 120(1), can represent any type of computing device having one or more processing unit(s) 122 operably connected to computer-readable media 124 such as via a bus 126, which in some instances can include one or more of a system bus, a data bus, an address bus, a PCI bus, a Mini-PCI bus, and any variety of local, peripheral, and/or independent buses.

Executable instructions stored on computer-readable media 124 can include, for example, an operating system 128, a search query frontend 130, and other modules, programs, or applications that are loadable and executable by processing units(s) 122.

Client computing device(s) 120 can also include one or more network interfaces 132 to enable communications between client computing device(s) 120 and other networked devices, such as other client computing device(s) 120 or device(s) 106 over network(s) 104. Such network interface(s) 132 can include one or more network interface controllers (NICs) or other types of transceiver devices to send and receive communications over a network.

In the example of FIG. 1, device(s) 106 can use search query interpreter 116 to receive queries from client computing device(s) 120 via the network(s) 104, determine whether the queries are related to client computing device(s) 120, and alter a retrieval (e.g., search) strategy when the queries are related to client computing device(s) 120. For instance, in some examples, the device(s) 106 can generate a new query when the device(s) 106 determine that the query is related to the client computing device(s) 120. In such examples, the device(s) 106 can use search query interpreter 116 to perform searches using the new queries, and send client computing device(s) 120 search results related to the new queries.

Additionally or alternatively, in some examples, client computing device(s) 120 can use search query frontend 130 to receive queries from a user, determine whether the queries are related to the client computing device(s) 120, and generate new queries when the queries are related to the client computing device(s) 120. The client computing device(s) 120 can further send the new queries to the device(s) 106, receive search results related to the new queries from the device(s) 106, and provide the search results to the user.

Figure 2:
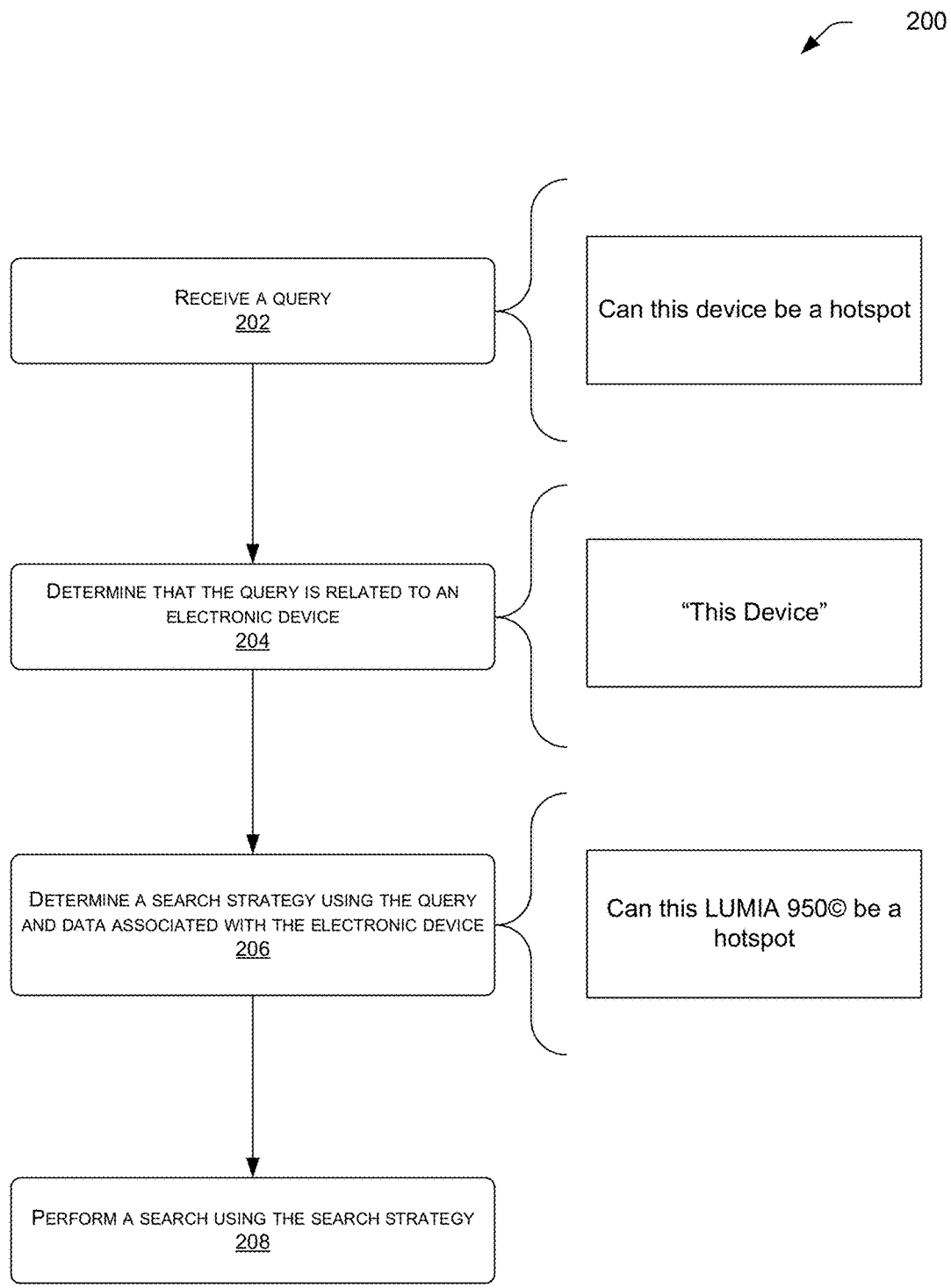
FIG. 2 illustrates a pictorial flow diagram of an example process for utilizing automatic identification and contextual reformulation on an implicit device-related query.

FIG. 2 illustrates a pictorial flow diagram 200 of an example process for utilizing automatic identification and contextual reformulation on an implicit device-related query. The example process is illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At block 202, a query is received. For instance, in some examples, device(s) 106 can receive a query from an electronic device, such as a client computing device 120. The query can correspond to web search text that includes plaintext and/or hypertext with optional search-directives. For instance, in the example of FIG. 2, the query includes the plaintext "Can this device be a hotspot".

At block 204, it is determined that the query is related to an electronic device. For instance, the device(s) 106 can utilize the search query interpreter 116 to determine whether the query is an implicit device query. In some example, the device(s) 106 can determine that the query is a fully implicit device query using query pairs that are stored in a query pair database. Additionally or alternatively, in some examples, the device(s) 106 can determine that the query is a semi-implicit device query based on the query including an indicator phrase associated with the electronic device. For instance, in the example of FIG. 2, the device(s) 106 can determine that the query is a semi-implicit device query based on the query including the phrase "This Device".

At block 206, a search strategy is determined based at least in part on the query and data associated with the electronic device. For instance, in some examples, the device(s) 106 can utilize the search query interpreter 116 to generate a new query that is based on the query and data associated with the client computing device 120. The data associated with the client comping device 120 can include information related to the client computing device 120, such as any hardware data, software data, and/or characteristic data associated with the client computing device 120. For instance, the data can include the model name of the client computing device 120, the operating platform of the client computing device 120, a wireless carrier associated with the client computing device 120, a representation of the electronic device's 120 configuration settings, a manifest of installed software on the client computing device 120, physical characteristics of the client computing device (e.g., the color, screen size, et.), or the like.

In some examples, the device(s) 106 can generate the new query by adding the information related to the client computing device 120 to the query. Additionally or alternatively, in some examples, the device(s) 106 can generate the new query by replacing the indicator phase within the query with the information related to the client computing device 120. For instance, in the example of FIG. 2, the device(s) 106 can replace the indicator phrase "This Device" with the model name of the client computing device 120 "LUMIA 950©" to generate the new query "Can this LUMIA 950© be a hotspot".

At block 208, a search is performed using the search strategy. For instance, device(s) 106 can perform a search using the new query to retrieve search results that are relevant to the client computing device. In some examples, to perform the search, the device(s) 106 can search the World Wide Web using the new query to retrieve information (e.g., web pages, images, or other types of files) that is related to the new query. Additionally or alternatively, in some examples, the device(s) 106 can mine data available in databases and/or directories using the new query to retrieve the information that is related to the query. Furthermore, in some examples, the device(s) 106 can include a question answering service that merely answers a question related to the new query.

It should be noted that, in some examples, the search strategy can include incorporating the data associated with the client computing device 120 into a search that is performed using the query. For instance, the device(s) 106 can perform a search using the query in order to retrieve search results. In some examples, the device(s) 106 can rank the search results based at least in part on the query. The device(s) 106 can then re-rank the search results using the data associated with the client computing device 120 in order to identify search results that are relevant to the client computing device 120.

For instance, in some examples, the device(s) 106 can use the data to re-rank the search results (e.g., web pages) based on how frequently the search results are selected by electronic devices that are similar to the client computing device 120. In some examples, the similar electronic devices include the same model as the client computing device 120, operating platform as the client computing device 120, wireless carrier as the client computing device 120, and/or installed software application as the client computing device 120. In some examples, the device(s) 106, search results that are selected more often are ranked higher than search results that are selected less often.

Additionally or alternatively, in some examples, the device(s) 106 can use the data to re-rank the search results based on how relevant the search results are to the client computing device 120. For instance, the device(s) 106 can analyze information (e.g., text, content, images, or the like) that is includes in each of the search results. The device(s) 106 can then re-rank the search results based on the search results including information that matches the model name of the client computing device 120, the operating platform of the client computing device 120, a wireless carrier associated with the client computing device 120, a representation of the electronic device's 120 configuration settings, a manifest of installed software on the client computing device 120, or the like. In some examples, the device(s) 106 re-ranks search results higher when information within the search results matches the data associated with the client computing device 120. The device(s) 106 can then provide the client computing device 120 with the re-ranked search results.

In some examples, the device(s) 106 can further retrieve search results based on the query and the new query. In such examples, the device(s) 106 can then combine the search results and provide the combined search results to the client computing device 120. For instance, the device(s) 106 can retrieve first search results related to the query. The device(s) 106 can additionally generate the new query using the processes above, and retrieve second search results related to the new query. The device(s) 106 can then combine the first search results with the second search results, and send the combined search results to the client computing device 120.

It should further be noted that, in some examples, client computing device(s) 120 can perform the example process of FIG. 2. For instance, a client computing device 120 can utilize the search query frontend 130 to receive a query, determine that the query is related to the client computing device 120, determine a search strategy based on the query and data associated with the client computing device 120, and perform a search using the search strategy. For instance, the client computing device 120 can generate a new query using the query and the data associated with the client computing device 120. The client computing device 120 and then send the new query to the device(s) 106. Based on sending the new query to the device(s) 106, the client computing device 120 can then receive search results that are relevant to the client computing device 120 from the device(s) 106.

Additionally, it should be noted that, in some examples, the query may already include data associated with the electronic device. In such examples, the search strategy may include performing a search using the query. In some examples, the search strategy may include generating a new query by adding additional data associated with the electronic device to the query and/or replacing the data associated with the electronic device within the query with new data associated with the electronic device. When generating a new query, the search strategy can include performing a search using one or more new queries and/or performing a search using one or more new queries and the original query to retrieve results.

Figure 3:
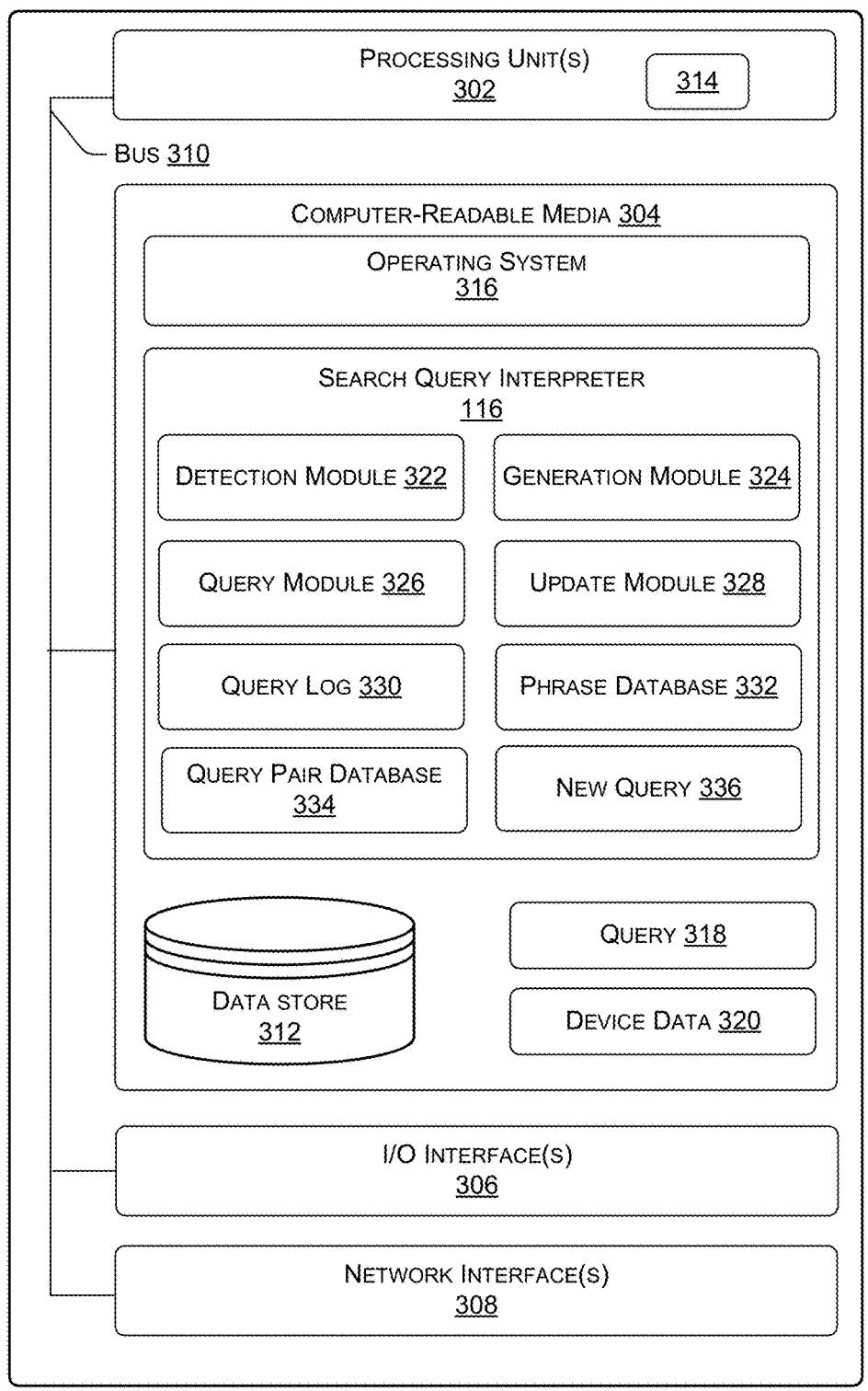
FIG. 3 is a block diagram illustrating an example computing device configured to perform automatic identification and contextual reformulation of implicit device-related queries.

FIG. 3 is a block diagram illustrating an example computing device configured to perform automatic identification and contextual reformulation of implicit device-related queries. Computing device 300 can represent device(s) 106.

Example computing device 300 includes one or more processing unit(s) 302, computer-readable media 304, input/output interface(s) 306, and network interface(s) 308. The components of computing device 300 are operatively connected, for example, via a bus 310, which can represent bus 112.

In example computing device 300, processing unit(s) 302 may correspond to processing unit(s) 108, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Computer-readable media 304 may correspond to computer-readable media 110, and can store instructions executable by the processing unit(s) 302. Computer-readable media 304 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 300, while in some examples one or more of a CPU, GPU, and/or accelerator is external to computing device 300.

Computer-readable media 304 may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 304 can be examples of computer storage media. Thus, the computer-readable media 304 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 306 allow computing device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 308, which may correspond to network interface(s) 118, can represent, for example, network interface controllers (NICs) or other types of transceiver devices to send and receive communications over a network.

In the illustrated example, computer-readable media 304 includes a data store 312. In some examples, data store 312 includes data storage such as a database, data warehouse, or other type of structured or unstructured data storage. In some examples, data store 312 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 312 can store data for the operations of processes, applications, components, and/or modules stored in computer-readable media 304 and/or executed by processing unit(s) 302 and/or accelerator(s). In some examples, data store 312 can store search query interpreter 116. Alternately, some or all of the above-referenced data can be stored on separate memories 314 on board one or more processing unit(s) 302 such as a memory on board a CPU-type processor, a GPU-type processor, an FPGA-type accelerator, a DSP-type accelerator, and/or another accelerator.

In the illustrated example of FIG. 3, computer-readable media 304 also includes operating system 316, which can represent operating system 114. Additionally, computer-readable media 304 includes search query interpreter 116, query 318, and device data 320. Search query interpreter 116 can include one or more modules, which are illustrated as blocks 322, 324, 326, and 328, although this is just an example, and the number can vary higher or lower. Functionality described associated with blocks 322, 324, 326, and 328 can be combined to be performed by a fewer number of modules or it can be split and performed by a larger number of modules.

Detection module 322 includes logic to program processing unit(s) 302 of computing device 300 to detect whether a query 318 is related to an electronic device. The query 318 can correspond to web search text that includes plaintext and/or hypertext with optional search-directives. In some examples, the computing device 300 receives the query from an electronic device, such as a client computing device 120 from FIG. 1. Additionally or alternatively, in some examples, the computing device 300 further receives device data 320 from the electronic device. The device data 320 can include information related to the electronic device, such as any hardware data, software data, and/or characteristic data associated with the electronic device. For instance, the data can include a model name of the electronic device, an operating platform of the electronic device, a wireless provider associated with the electronic device, a representation of the electronic device's configuration settings, a manifest of installed software applications on the electronic device, physical characteristics of the electronic device (e.g., the color, screen size, et.), or some other information associated with the electronic device. For instance, in some examples, the device data 320 can include a user-agent string. The computing device 300 can then utilize the detection module 322 to determine whether the query 318 is related to the electronic device.

For instance, in some examples, the computing device 300 can determine whether the query 318 is a semi-implicit device query or a fully implicit device query. To determine that the query 318 is a semi-implicit device query, the detection module 322 identifies that the query 318 has been posed by more than one user and/or that the query 318 contains an indicator phrase. For instance, the computing device 300 can utilize the query log 330 to determine whether the query 318 has been posed by one or more users. The query log 330 can include a database of stored queries that the computing device 300 receives from electronic devices. As such, the computing device 300 can use the query log 330 to determine whether the electronic device that sent the query 318 and/or another electronic device has performed a query search using a similar query. In some examples, a similar query may match the query 318, such as by including the same plaintext. In some examples, a similar query includes a threshold number of similarities to the query 318. In such examples, the threshold can include a threshold number of words (e.g., two words, three words, or the like) and/or a threshold percentage of words (e.g., sixty percent of the words match).

Additionally or alternatively to determining whether the query 318 has been posed by more than one user, the computing device 300 can utilize the phrase database 332 to determine whether the query 318 contains an indicator phrase. The phrase database 332 can include a database of stored indicator phrases that the computing device 300 uses when identifying semi-implicit device queries. Indicator phrases stored in the phrase database 332 can include phrases such as "this phone", "my phone", "this device", "the device", "this computer", "my computer", or any other phrase that includes a reference to an electronic device. In some examples, the computing device 300 can determine that the query 318 is a semi-implicit device phrase when the query 318 has been posed by more than one user and contains an indicator phrase. In some examples, the computing device 300 can determine that the query 318 is a semi-implicit device phrase when the query 318 merely contains an indicator phrase.

The computing device 300 can further utilize the detection module 322 to determine whether a query 318 is a fully implicit device query. For instance, the computing device 300 can use a query pair database 334 to determine that the query 318 is listed among the query pairs included in the query pair database 334. The query pair database 334 can include a database of stored query pairs that the computing device 300 can use to identify fully implicit device queries. In some examples, a query pair includes a pair of successive queries that the computing device 300 receives from an electronic device. In such examples, one of the queries does not include an indicator phrase (e.g., device name, platform name, or other phrase that makes reference to an electronic device) and the other query does include an indicator phrase.

To determine whether the query 318 is listed among the query pairs in the query pair data 334, the computing device 300 can search the query pair database 334 using the query 318 to identify one or more similar queries stored on the query pair database 334. In some examples, a similar query may match the query 318, such as by including the same plaintext. In some examples, a similar query includes a threshold number of similarities to the query 318. In such examples, the threshold can include a threshold number of words (e.g., two words, three words, or the like) and/or a threshold percentage of words (e.g., sixty percent of the words match). The computing device 300 can thus determine that the query 318 is a fully implicit device query when the query 320 is similar to a query included in a query pair.

For instance, the computing device 300 can determine that the query 318 is similar to a query that does not include an indicator phrase. The computing device 300 can determine whether the similar query, which does not include an indicator phrase, is paired with another query that includes an indicator phrase. If the similar query includes a query pair with another query that includes an indicator phrase, the computing device 300 can determine that the query 318 is a fully implicit device query.

Generation module 324 includes logic to program processing unit(s) 302 of computing device 300 to generate new queries that are based on the query 318. For instance, the computing device 300 can use the generation module 324 to generate a new query 336 based on the query 318 and the device data 320. The device data 320 can include information related to an electronic device, such as any hardware data, software data, and/or characteristic data associated with the electronic device. For instance, the data can include a model name of the electronic device, the operating platform on the electronic device, a representation of the electronic device's configuration settings, a wireless carrier associated with the electronic device, a manifest of stored software applications on the electronic device, and/or additional information related to the electronic device. In some examples, the computing device 300 receives the device data 320 from the electronic device along with the query 318. In some examples, the computing device 300 stores the device data 320 in the computer-readable media 304. In such examples, the computing device 300 can utilize the device data 320 each time the computing device 300 receives a query 318 from the electronic device.

In some examples, the computing device 300 generates the new query 336 by replacing an indicator phrase within the query 318 with the information related to the electronic device. For instance, if the query 318 is a semi-implicit device query "Can this device be a hotpot", the computing device 300 can generate a new query 336 that includes "Can this LUMIA 950© be a hotspot". Additionally or alternatively, in some examples, the computing device 300 generates a new query 336 by adding the information related to the electronic device to the query 318. When adding the information related to the electronic device, the computing device 300 can add the information to the beginning, middle, and/or end of the query 318. For instance, if the query 318 is a fully implicit device query "How do I take a screenshot", the computing device 300 can generate a new query 336 that includes "How do I take a screenshot on this LUMIA 950©".

In some examples, the computing device 300 can determine which information from the device data 320 to use when generating a new query 336. For instance, as discussed above, the device data 320 can include information related to an electronic device, such as any hardware data, software data, and/and/or characteristic data associated with the electronic device. For instance, the data can include the model name of the electronic device, the operating platform of the electronic device, a representation of the electronic device's configuration settings, a wireless carrier associated with the electronic device, a manifest of installed application on the electronic device, and/or additional information related to the electronic device. As such, in some examples, the computing device 300 can determine whether to use one or more of the model name, the operation platform, a configuration setting, the wireless carrier, an identify of a software application, and/or the additional information when generating the new query 336.

Additionally or alternatively, in some examples, the computing device 300 may generate a first query using a first portion of the device data 320 (e.g., a model name), and the computing device 300 may generate one or more additional queries using one or more additional portions of the device data 320 (e.g., an operation platform). In such examples, the computing device 300 can perform a first search using first query in order to retrieve first results, and perform a second search using the second query in order to retrieve second results. The computing device 300 can then merge the results of the first and second searches for the electronic device.

Query module 326 includes logic to program processing unit(s) 302 of computing device 300 to perform a search a determined search strategy. For instance, in some examples, the computing device 300 can use the query module 326 to search the World Wide Web using the new query 336 to retrieve information (e.g., web pages, images, or other types of files) that is related to the new query 336. Additionally or alternatively, in some examples, the computing device 300 can use the query module 326 to mine data available in databases and/or directories using the new query 336 to retrieve the information related to the new query 336. Furthermore, in some examples, the computing device 300 can use the query module 326 to determine an answer (e.g., single search result) to the new query 336 for the electronic device (e.g., if the computing device 300 includes question answering service).

Additionally or alternatively, the computing device 300 can use the query module 326 to perform a search using the query 318 and then re-rank search results of the search using the device data 320. For instance, the computing device 300 can use the device data 320 to re-rank search results (e.g., web pages) based on how frequently the search results are selected by electronic devices that are similar to the electronic device. In some examples, the similar electronic devices include the same model as the electronic device, operating platform as the electronic device, wireless carrier as the electronic device, and/or installed software application as the electronic device.

The computing device 300 can further use the query module 326 to provide search results to the electronic device. For instance, in some examples, the computing device 300 can provide the electronic device with search results that are related to the new query 336. In some examples, the computing device 300 can provide the electronic device with the results that were re-ranked using the device data 320. Furthermore, in some examples, the computing device 300 can provide the electronic device with a search result that includes an answer to the query 318 and/or the new query 336.

Update module 328 can include logic to program processing unit(s) 302 of computing device 300 to update the query log 330, the phrase database 332, and/or the query pair database 334. For instance, the computing device 300 can use the update module 328 to add new queries to the query log 330. In some examples, the new queries are added to the query log 320 each time the computing device 300 receives a query from an electronic device. The computing device 300 can further use the update module 328 to add new indicator phrases to the phrase database 332. Additionally, the computing device 300 can use the update module 328 to add new query pairs to the query pair database 334. In some examples, a new query pair is added to the query pair database 334 each time the update module 328 identifies a query pair.

For example, to identify query pairs, the update module 328 can utilize a likelihood ratio test to detect reformulations of search queries on received training data. For instance, the update module 328 can define a query pair, $\langle q_1, q_2 \rangle$, as a pair of successive queries that the computing device 300 receives from an electronic device within a threshold period of time (e.g., 1 minute, 5 minutes, 30 minutes, or the like). The query pair $\langle q_1, q_2 \rangle$ includes a first query, $q_1$, and a second query, $q_2$. The second query, $q_2$, is then abstracted as a Boolean event, $s_2$, which occurs whenever $q_2$ includes an indicator phrase, or explicitly mentions a user's system, platform or device by name. The update module 328 can then use two competing hypotheses to analyze the occurrence frequencies of query pairs $\langle q_1, s_2 \rangle$.

$$H_0: P(s_2|q_1) = P(s_2|\neg q_1) \qquad (1)$$

$$H_1: P(s_2|q_1) = p_1 \neq p_2 = P(s_2|\neg q_2) \qquad (2)$$

The first hypothesis, $H_0$, asserts that $s_2$ occurs independently from $q_1$. Conversely, the second hypothesis, $H_1$, asserts that $s_2$ is dependent on $q_1$. Using the first and second hypothesis, the likelihood ratio test statistic, X, can be computed by observed data stored in the query log 330:

$$X^2 = -2 \log(L(H_0)/L(H_1)) \qquad (3)$$

In some examples, the first hypothesis, $H_0$, is rejected when the likelihood ratio test statistic, X, is larger than a threshold number (e.g., 28). Rejecting $H_0$ is taken as an indication that $q_1$ requires an explicit system reformulation. In some examples, the update module 328 can then store queries that require an explicit system reformulation in the query pair database 334. For instance, in such examples, the update module 328 stores the implicit query, $q_1$, of the query pair in the query pair database 334. Additionally or alternatively, in some examples, the update module 328 stores both queries from the query pair in the query pair database 334. In some examples, update module 328 stores the queries in the query pair database 334 using a lookup table.

It should be noted, that some examples, the update module 328 can utilize other processes for identifying and storing query pairs in the query pair database 334. For instance, the update module 328 can utilize any process that identifies a query pair, where a first of the queries is an implicit device query and a second of the queries is a non-implicit device query. For instance, in some examples, the update module 328 use utilize any type of trained classifier that pairs queries together to identify and store query pairs in the query pair database 334. In some examples, the update module 328 can utilize supervised learning processes to identify and store query pairs in the query pair database 334. Furthermore, in some examples, the update module 328 can identify and store query pairs in the query pair database 334 based on how frequently the query pairs are searched by electronic devices.

In some examples, when identifying a query pair, the update module 328 uses a threshold period of time. For instance, the computing device 300 must receive both queries of the query pair within the threshold period of time in order for the queries to include a query pair. The threshold period of time can include five minutes, ten minutes, twenty minutes, thirty minutes, or the like.

It should further be noted that, in some examples, the device data 320 may include data associated with an electronic device that did not send the query 318. For instance, the computing device 300 may receive a query 318 from a first electronic device. The computing device 300 may further receive device data 320 from the first computing device, where the device data 320 is associated with a second computing device. The computing device 300 can then generate the new query 336 based on the query 318 and the device data 320 that is associated with the second computing device, perform a search using the new query 336 to retrieve search results that are relevant to the second computing device, and send search results to at least one of the first computing device or the second computing device.

Figure 4:
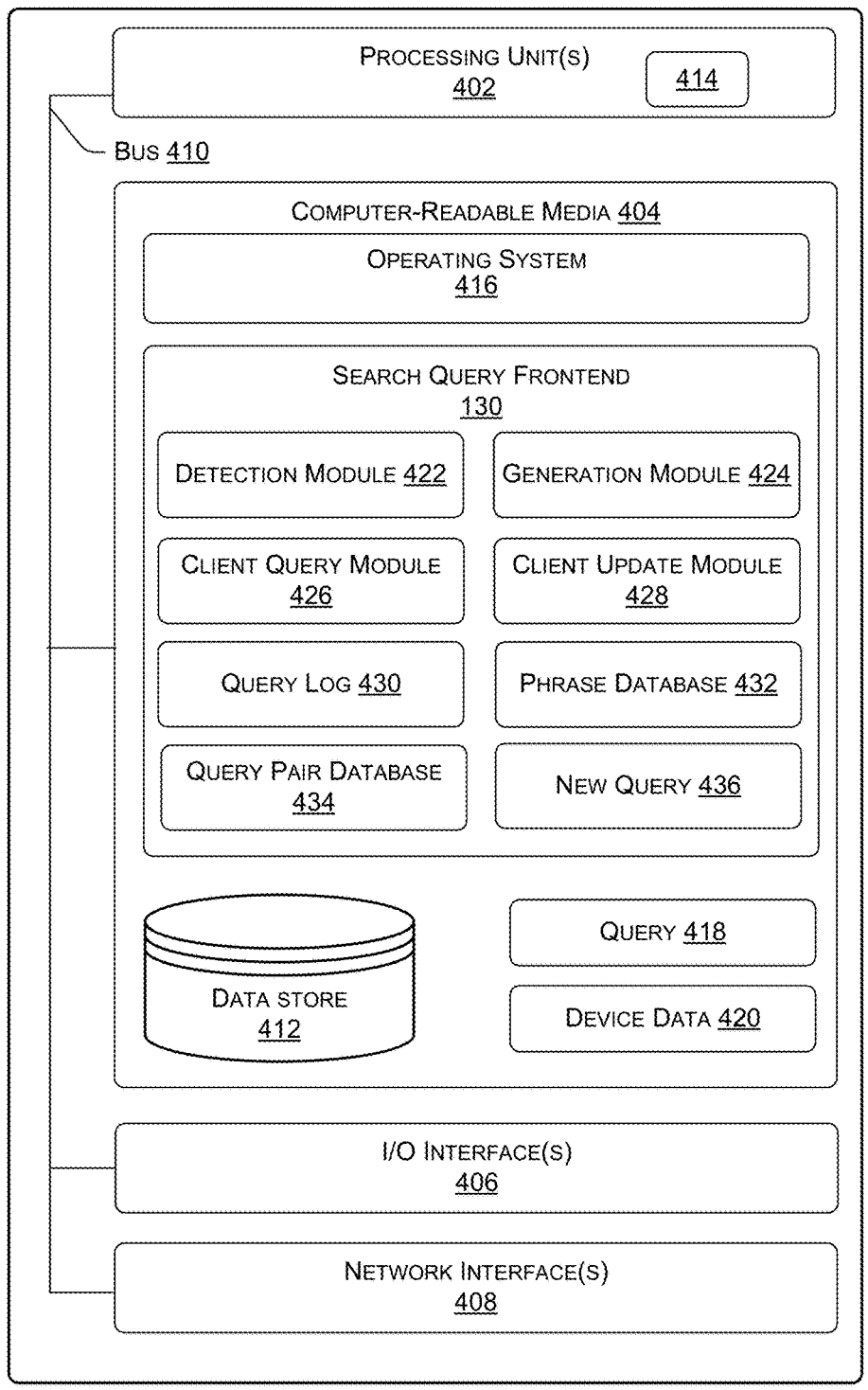
FIG. 4 is a block diagram illustrating an example client computing device configured to perform automatic identification and contextual reformulation of implicit device-related queries.

FIG. 4 is a block diagram illustrating an example client computing device configured to perform automatic identification and contextual reformulation of implicit device-related queries. Computing device 400 can represent client computing device(s) 120. Example computing device 400 includes one or more processing unit(s) 402, computer-readable media 404, input/output interface(s) 406, and network interface(s) 408. The components of computing device 400 are operatively connected, for example, via a bus 410, which can represent bus 126.

In example computing device 400, processing unit(s) 402 may correspond to processing unit(s) 122, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Computer-readable media 404 may correspond to computer-readable media 124, and can store instructions executable by the processing unit(s) 402. Computer-readable media 404 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 400, while in some examples one or more of a CPU, GPU, and/or accelerator is external to computing device 400.

Computer-readable media 404 may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 404 can be examples of computer storage media. Thus, the computer-readable media 404 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 406 allow computing device 400 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 408, which may correspond to network interface(s) 132, can represent, for example, network interface controllers (NICs) or other types of transceiver devices to send and receive communications over a network.

In the illustrated example, computer-readable media 404 includes a data store 412. In some examples, data store 412 includes data storage such as a database, data warehouse, or other type of structured or unstructured data storage. In some examples, data store 412 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 412 can store data for the operations of processes, applications, components, and/or modules stored in computer-readable media 404 and/or executed by processing unit(s) 402 and/or accelerator(s). In some examples, data store 412 can store search query frontend 130. Alternately, some or all of the above-referenced data can be stored on separate memories 414 on board one or more processing unit(s) 402 such as a memory on board a CPU-type processor, a GPU-type processor, an FPGA-type accelerator, a DSP-type accelerator, and/or another accelerator.

In the illustrated example of FIG. 4, computer-readable media 404 also includes operating system 416, which can represent operating system 128. Additionally, computer-readable media 404 includes search query frontend 130, query 418, and device data 420. Search query frontend 130 can include one or more modules, which are illustrated as blocks 422, 424, 426, and 428, although this is just an example, and the number can vary higher or lower. Functionality described associated with blocks 422, 424, 426, and 428 can be combined to be performed by a fewer number of modules or it can be split and performed by a larger number of modules.

Detection module 422, which can perform similar functions as detection module 322, includes logic to program processing unit(s) 402 of computing device 400 to detect whether a query 418, which can represent query 318, is related to an electronic device. The query 418 can correspond to web search text that includes plaintext and/or hypertext with optional search-directives. In some examples, the computing device 400 receives the query 418 via one or more microphones capturing spoken words from a user. In some examples, the computing device 400 receives the query 418 via one or more input devices (e.g., a keyboard, a touch-sensitive display, or the like). The computing device 400 can then utilize detection module 422 to determine whether the query 418 is related to the client computing device 400, using a similar process as described above for detection module 322.

For instance, the computing device 400 can utilize detection module 422 to determine whether the query 418 is an implicit device query (semi-implicit device query or fully implicit device query). In some examples, the computing device 400 can determine that the query 418 is a semi-implicit device query using a query log 430 and/or a phrase database 432, which can represent the query log 330 and the phrase database 332. In some examples, the computing device 400 can determine that the query 418 is a fully implicit device query using the query pair database 434, which can represent the query phrase database 434.

Generation module 424, which can perform similar functions as generation module 324, includes logic to program processing unit(s) 402 of computing device 400 to generate new queries that are based on the query 418, using a similar process as the generation module 324 above. For instance, the computing device 400 can use the generation module 424 to generate a new query 436 based on the query 418 and the device data 420, which can represent the device data 320. The device data 420 can include information related to the computing device 400, such as a model name of the computing device 400, an operating platform of the computing device 400, a representation of the electronic device's 400 configuration settings, a wireless provider associated with the computing device 400, a manifest of software application stored on the computing device 400, and/or additional information associated with the computing device 400. For instance, in some examples, the device data 420 can include a user-agent string.

In some examples, the computing device 400 generates the new query 436 by replacing an indicator phrase within the query 418 with the information related to the computing device 400. For instance, if the query 418 is a semi-implicit device query "Can this device be a hotpot", the computing device 400 can generate a new query 436 that includes "Can this LUMIA 950© be a hotspot". In some examples, the computing device 400 generates a new query 436 by adding the information related to the computing device 400 to the query 418. When adding the information related to the computing device 400, the computing device 400 can add the information to the beginning, middle, and/or end of the query 418. For instance, if the query 418 includes a fully implicit device query "How do I take a screenshot", the computing device 400 can generate a new query 436 that includes "How do I take a screenshot on this LUMIA 950©".

In some examples, the computing device 400 can determine which information from the device data 420 to use when generating a new query 436. For instance, as discussed above, the device data 420 can include information related to the computing device 400, such as any hardware data, software data, and/or characteristic data associated with the computing device 400. For instance, the device data 420 can include a model name of the computing device 400, an operating platform of the computing device 400, a representation of the electronic device's 400 configuration settings, a network (e.g., wireless provider) associated with the computing device 400, a manifest of software application stored on the computing device 400, physical characteristics of the computing device 400 (e.g., the color, screen size, et.), and/or additional information associated with the computing device 400. As such, in some examples, the computing device 400 can determine whether to use one or more of the model name, the operation platform, the wireless provider, a configuration setting, an identify of a software application, or the additional information when generating the new query 436.

Additionally or alternatively, in some examples, the computing device 400 may generate a first query using a first portion of the device data 420 (e.g., a model name), and the computing device 400 may generate one or more additional queries using one or more additional portions of the device data 420 (e.g., an operation platform). In such examples, the computing device 400 can perform a search using each of the generated queries.

Client query module 426 includes logic to program processing unit(s) 402 of computing device 400 to perform a search using the new query 436. For instance, in some examples, the computing device 400 can utilize the client query module 426 to send the new query 436 to a query service, such as device(s) 106. The computing device 400 can then receive search results related to the new query 436 from the query service. In some examples, after receiving the search results, the computing device 400 can use the client query module 426 to provide the search results to a user. For instance, the computing device 400 can display the search results to the user via a display device. Additionally or alternatively, the computing device 400 can output the search results to the user via one or more speakers.

Additionally or alternatively, in some examples, the computing device 400 can utilize the client query module 426 to retrieve search results. For instance, the computing device 400 can use the client query module 426 to search the World Wide Web using the new query 436 to retrieve information (e.g., web pages, images, or other types of files) that is related to the new query 436. Additionally or alternatively, in some examples, the computing device 400 can use the client query module 426 to mine data available in databases and/or directories using the new query 436 to retrieve the information related to the new query 436. Furthermore, in some examples, the computing device 400 can use the client query module 426 to determine an answer (e.g., single search result) to the new query 436.

Client update module 428 can include logic to program processing unit(s) 402 of computing device 400 to update the query log 430, the phrase database 432, and/or the query pair database 434. For instance, in some examples, the computing device 400 can receive updates to the query log 430, the phrase database 432, and/or the query pair database 434 from a query service, such as device(s) 106. The computing device 400 can then use client update module 428 to update each of the query log 430, the phrase database 432, and/or the query pair database 434 using the received updates.

FIGS. 5-8 illustrate example processes for performing automatic identification and contextual reformulation of implicit device-related queries. The example processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 5:
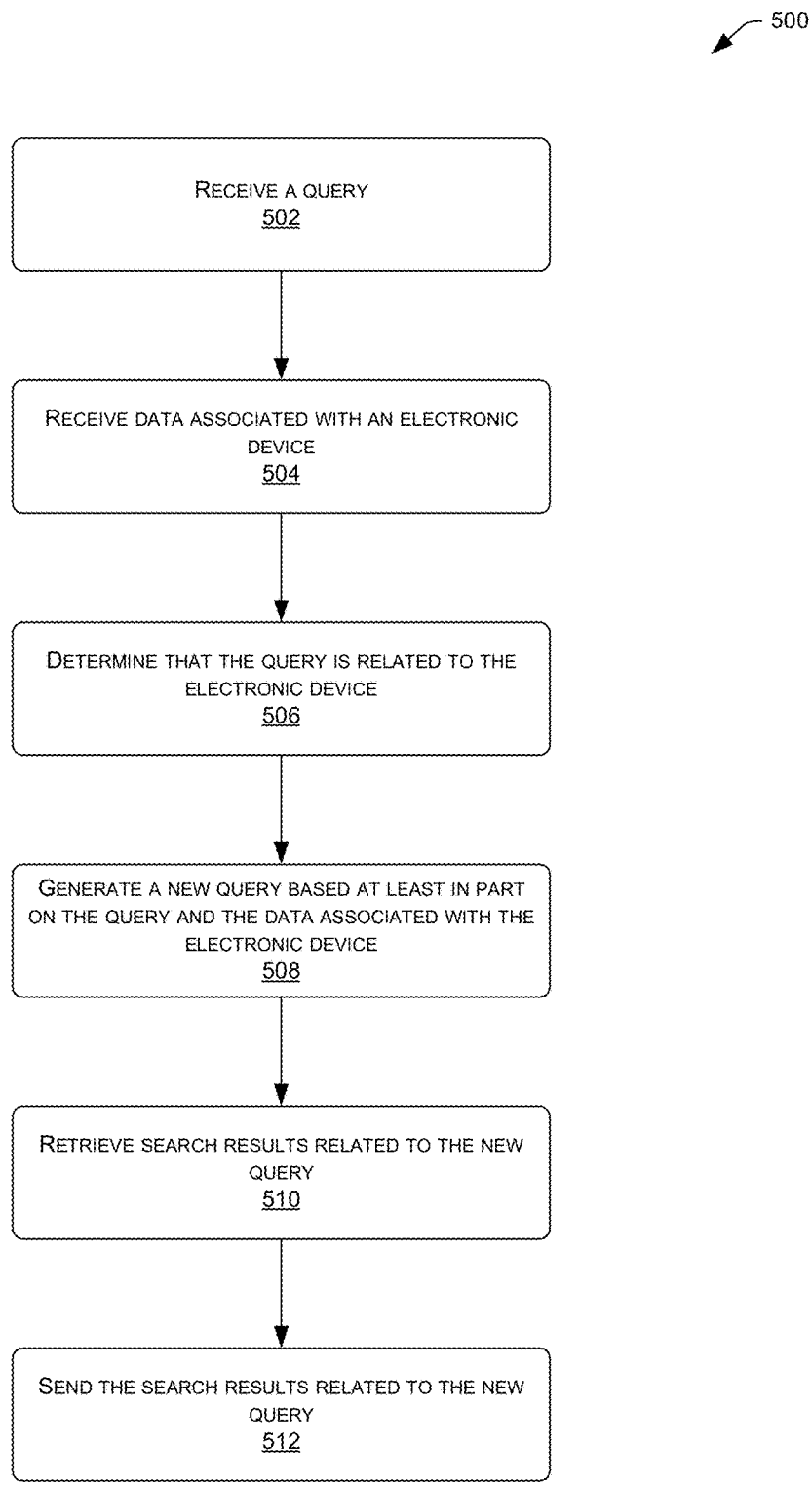
FIG. 5 is a flow diagram of a first example process of performing automatic identification and contextual reformulation of implicit device-related queries.

FIG. 5 is a flow diagram 500 of an example process of a system performing automatic identification and contextual reformulation of implicit device-related queries. At block 502, a query is received. For instance, the computing device 300 can receive a query 318 from an electronic device, such as a client computing device 120 from FIG. 1. The query 318 can correspond to web search text that includes plaintext and/or hypertext with optional search-directives. In some examples, the computing device 300 may receive the query 318 in unencrypted form. In some examples, the computing device 300 may receive the query 318 in encrypted form. In such examples, the computing device 300 can decrypt the query 318 after receiving the query 318 from the electronic device.

At 504, data associated with an electronic device is received. For instance, in some examples, the computing device 300 can receive device data 320 from the electronic device, such as a client computing device 120 from FIG. 1. Additionally or alternatively, in some example, the computing device 300 may store the device data 320 in a computer-readable media. In such examples, to receive the device data 320, the computing device 300 may retrieve the stored device data 320 from the computer-readable media. As discussed above, the device data 320 can include information related to the electronic device, such as a model name of the electronic device, an operating platform of the electronic device, a representation of the electronic device's configuration settings, a wireless carrier associated with the electronic device, a manifest of stored software application on the electronic device, and/or additional information associated with the electronic device.

At block 506, it is determined that the query is related to the electronic device. For instance, the computing device 300 can utilize the detection module 322 to determine that the query 318 is an implicit device query. In some examples, the computing device 300 can utilize the detection module 322 to determine that the query 318 is a semi-implicit device query based on the query 318 including an indicator phrase. In some examples, the computing device 300 can utilize the detection module 322 to determine that the query 318 is a fully implicit device query based on identifying query pairs using the query pair database 334.

At 508, a new query is generated based at least in part on the query and the data associated with the electronic device. For instance, the computing device 300 can utilize the generation module 324 to generate a new query 336 based on the query 318 and the device data 320. In some examples, the computing device 300 generates the new query 300 by replacing an indicator phrase within the query 318 with the information related to the electronic device. In some examples, the computing device 300 generates the new query 336 by adding the information related to the electronic device to the query 318.

At 510, search results related to the new query are retrieved. For instance, the computing device 300 can utilize the query module 326 to retrieve search results that are relevant to the electronic device. In some examples, the computing device 300 can use the query module 326 to search the World Wide Web using the new query 336 to retrieve information (e.g., web pages, images, or other types of files) that is related to the new query 336. Additionally or alternatively, in some examples, the computing device 300 can use the query module 326 to mine data available in databases and/or directories using the new query 336 to retrieve the information related to the new query 336. Furthermore, in some examples, the computing device 300 can use the query module 326 to determine an answer (e.g., single search result) to the new query 336 for the electronic device (e.g., if the computing device 300 includes question answering service).

At 512, the search results related to the new query are sent. For instance, the computing device 300 can send the search results related to the new query 336 to the electronic device, such as the client computing device 120 from FIG. 1. The electronic device can then provide the search results to a user. For instance, the electronic device can display the search results via a display device and/or output the search results via one or more microphones.

It should be noted that, in some examples, the computing device 300 can generate more than one new query 336, where each new query 336 is based on the query 318 and the device data 320. For instance, the computing device 300 can generate a first new query 336 that is based on a first part on the device data 320 (e.g., the model name of the electronic device) and a second new query 336 that is based on a second part of the device data 320 (e.g., the operating platform of the electronic device). The computing device 300 can then perform a first search using the first new query 336 and a second search using the second new query 336.

In some examples, the computing device 300 can send the electronic device the results for the first search and the results for the second search. Additionally or alternatively, in some examples, the computing device 300 can first interleave the results of the first and second searches in order to generate merged results. The computing device 300 can then send the merged results to the electronic device.

Figure 6:
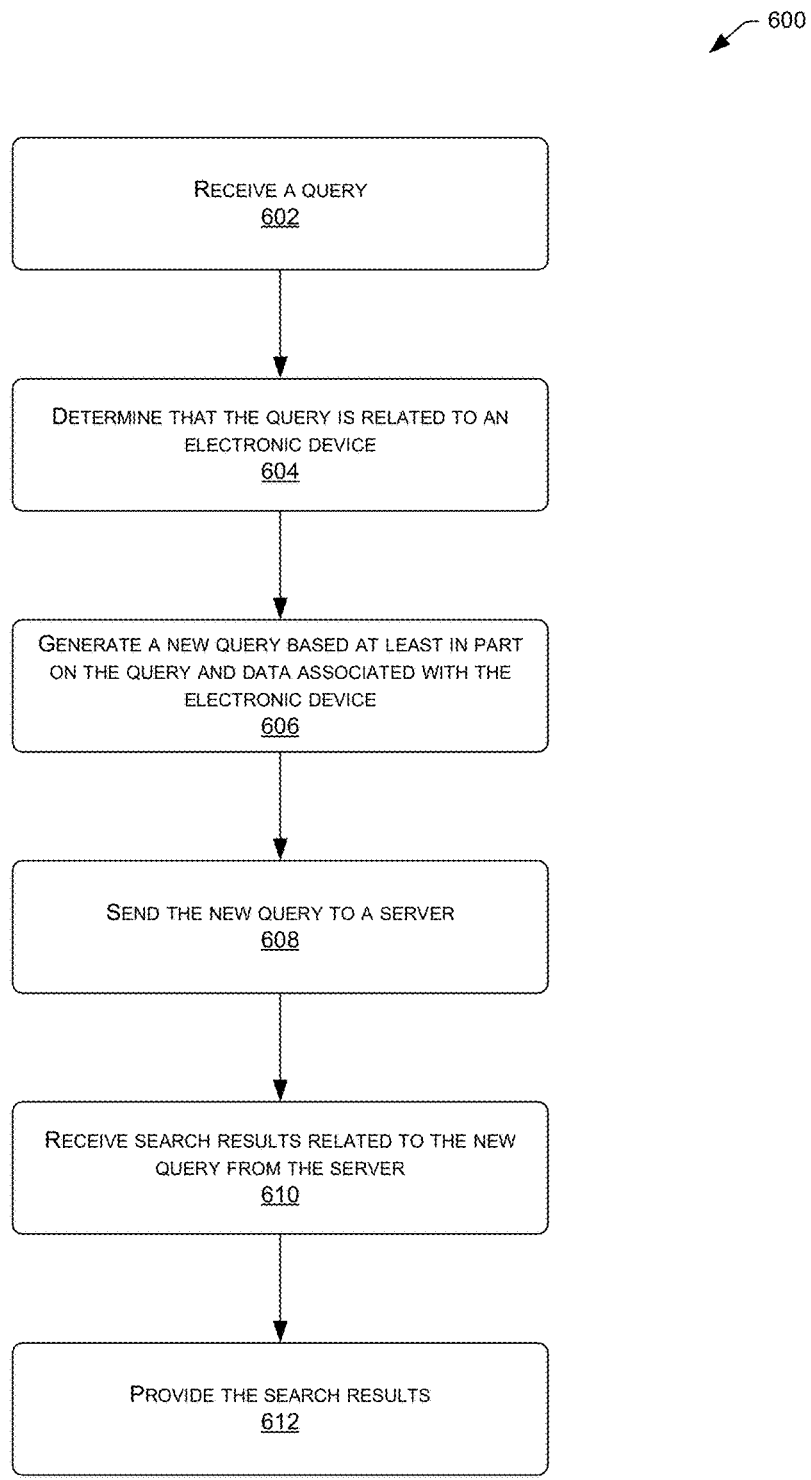
FIG. 6 is a flow diagram of a second example process of performing automatic identification and contextual reformulation of implicit device-related queries.

FIG. 6 is a flow diagram 600 of an example process of an electronic device performing automatic identification and contextual reformulation of implicit device-related queries. At block 602, a query is received. For instance, a computing device 400 may receive a query 418 from a user. The query 418 can correspond to web search text that includes plaintext and/or hypertext with optional search-directives. In some examples, the computing device 400 can capture the query 418 which is spoken by the user via one or more microphones. In some examples, the computing device 400 can receive the query 418 from the user via one or more input devices (e.g., keyboard, touch-sensitive display, or the like).

At 604, it is determined that the query is related to an electronic device. For instance, the computing device 400 can utilize a detection module 422 to determine that the query 418 is an implicit device query. In some examples, the computing device 400 can determine that the query 418 is a semi-implicit device query based on the query 418 including an indicator phrase. In some examples, the computing device 400 can determine that the query 418 includes a fully implicit device query based on identifying query pairs using a query pair database 434.

At 606, a new query is generated based at least in part on the query and data associated with the electronic device. For instance, the computing device 400 can utilize generation module 424 to generate a new query 436 based on the query 418 and device data 420. In some examples, the computing device 400 can generate the new query 436 by replacing an indicator phrase within the query 418 with information related to the computing device 400. In some examples, the computing device 400 can generate the new query 436 by adding the information related to the computing device 400 to the query 418.

At 608, the new query is sent to a server and at 610, search results related to the new query are received from the server. For instance, in some examples, the computing device 400 can utilize the client query module 426 send the new query 436 to a query server, such as device(s) 106. In response, the device(s) 106 can perform a search using the new query 436 in order to retrieve search results that are relevant to the computing device 400. The computing device 400 can then receive the search results from the device(s) 106.

At 612, the search results are provided. For instance, the computing device 400 can provide the search results to a user. In some examples, providing the search results can include displaying the search results via a display device of the computing device 400. In some examples, providing the search results can include outputting the search results via one or more microphones of the computing device 400.

Figure 7:
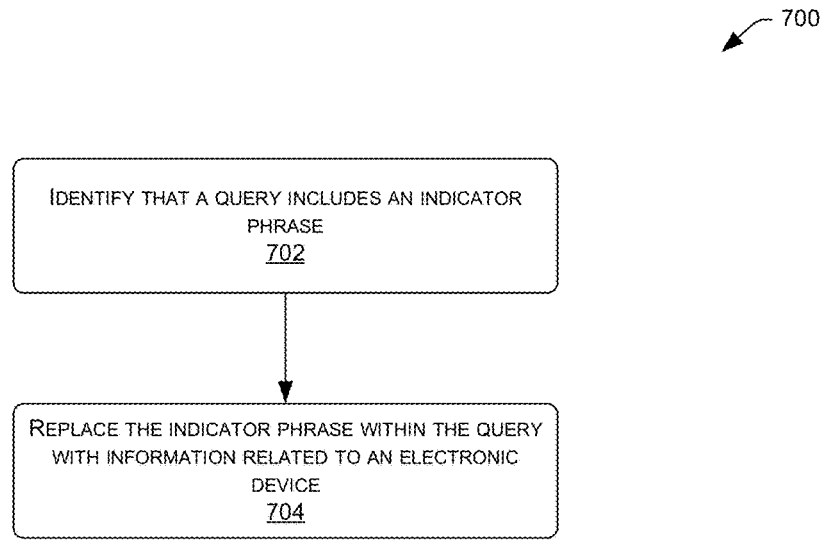
FIG. 7 is a flow diagram of an example process of generating a new query that is based on a semi-implicit device query.

FIG. 7 is a flow diagram 700 of an example process of generating a new query that is based on a semi-implicit device query. At block 702, it is identified whether a query includes an indicator phrase. For instance, the computing device 300 can utilize the phrase database 332 to determine whether the query 318 includes an indicator phrase. The phrase database 332 can include a database of stored indicator phrases that the detection module 322 uses when identifying semi-implicit device queries. Indicator phrases stored in the phrase database 332 can include phrases such as "this phone", "my phone", "this device", "the device", "this computer", "my computer", or any other phrase that includes a reference to an electronic device.

At 704, the indicator phrase within the query is replaced by information related to an electronic device. For instance, the computing device 300 can generate a new query 336 by replacing the indicator phrase within the query 318 with information related to an electronic device. In some examples, the computing device 300 can replace the indicator phrase with a model name of the electronic device. Additionally or alternatively, the computing device 300 can replace the indicator phrase with an operating platform of the electronic device. The computing device 300 can then perform a search using the new query 336.

Figure 8:
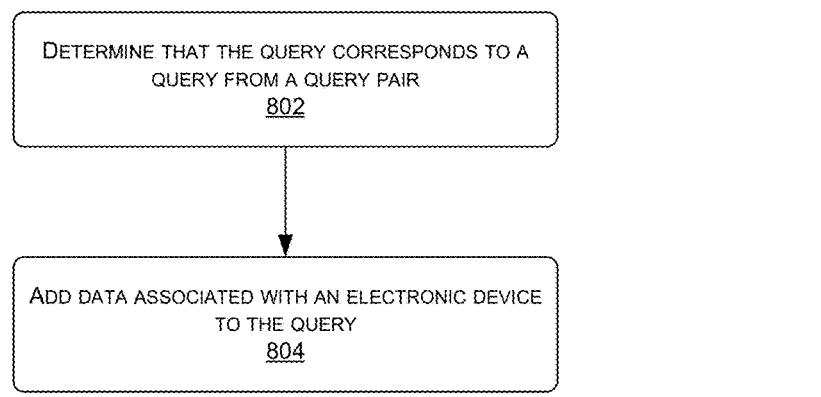
FIG. 8 is a flow diagram of an example process of generating a new query that is based on a fully implicit device query.

FIG. 8 is a flow diagram 800 of an example process of generating a new query that is based on a fully implicit device query. At 802, it is determined that the query corresponds to a query from a query pair. For instance, the computing device 300 can utilize the query pair database 334 to determine that a query 3230 corresponds to a query from a query pair. In some examples, a query pair can include a pair of queries where one query does not include an indicator phrase and the other query includes the indicator phrase. As such, in some examples, the computing device 300 can determine that the query 318 is similar to (discussed above) the query that does not include the indicator phrase. In response, the computing device 300 can determine that the query 318 is a fully implicit device query.

At 804, information related to an electronic device is added to the query. For instance, the computing device 300 can generate a new query 336 by adding information related to an electronic device to the query 318. In some examples, the computing device 300 can add the information to the beginning, middle, and/or end of the query 318. In some examples, the computing device 300 can add a model name of the electronic device, an operating platform of the electronic device, and/or both the model name and the operating system to the query 318. The computing device 300 can then perform a search using the new query 336.

Figure 9:
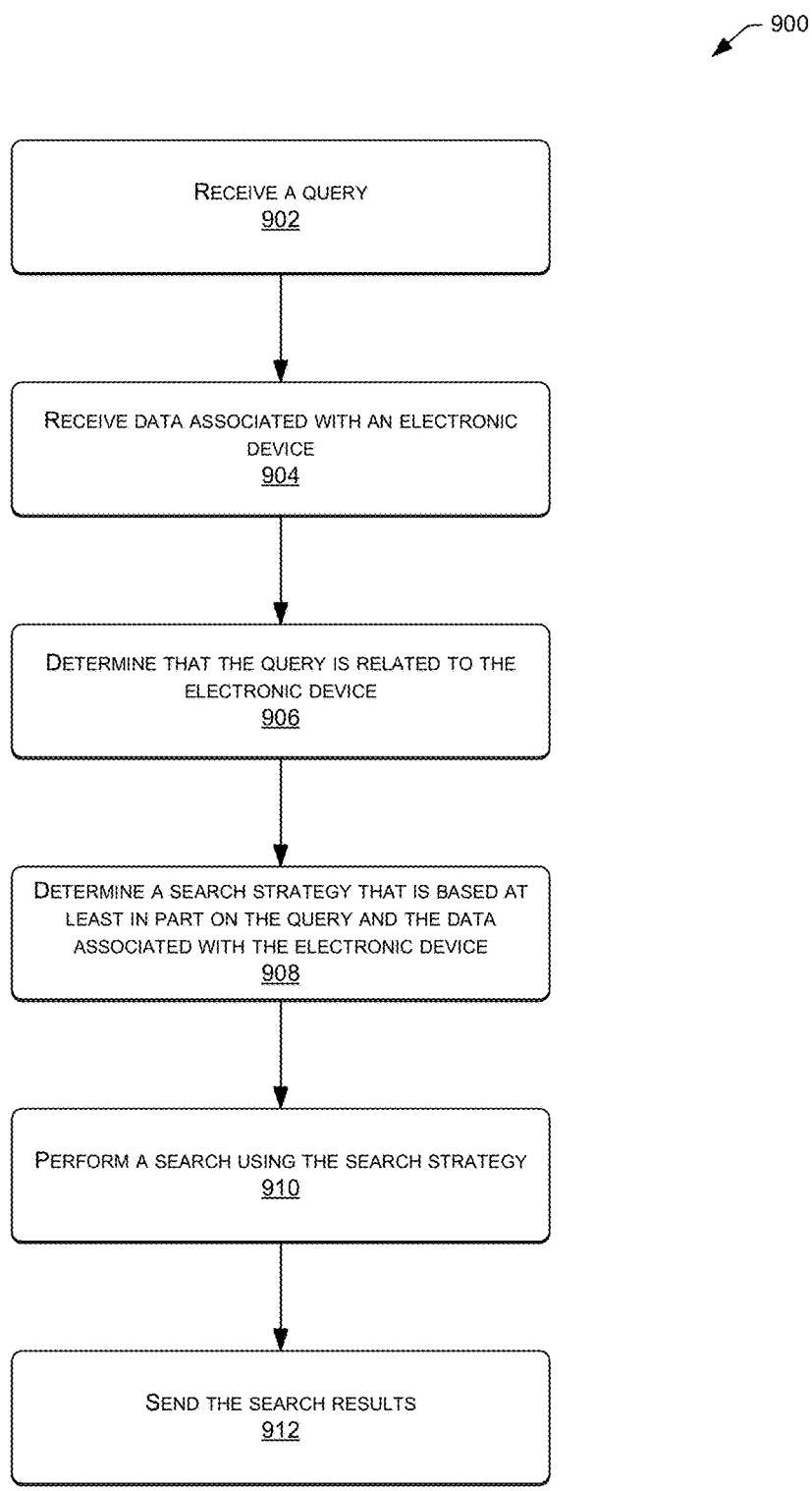
FIG. 9 is a flow diagram of an example process of performing a search by incorporating data associated with an electronic device with a query.

FIG. 9 is a flow diagram 900 of an example process of performing a search by incorporating data associated with an electronic device with a query. At block 902, a query is received. For instance, the computing device 300 can receive a query 318 from an electronic device, such as a client computing device 120 from FIG. 1. The query 318 can correspond to web search text that includes plaintext and/or hypertext with optional search-directives. In some examples, the computing device 300 may receive the query 318 in unencrypted form. In some examples, the computing device 300 may receive the query 318 in encrypted form. In such examples, the computing device 300 can decrypt the query 318 after receiving the query 318 from the electronic device.

At 904, data associated with an electronic device is received. For instance, in some examples, the computing device 300 can receive device data 320 from the electronic device, such as a client computing device 120 from FIG. 1. Additionally or alternatively, in some example, the computing device 300 may store the device data 320 in a computer-readable media. In such examples, to receive the device data 320, the computing device 300 may retrieve the stored device data 320 from the computer-readable media. As discussed above, the device data 320 can include information related to the electronic device, such as a model name of the electronic device, an operating platform of the electronic device, a representation of the electronic device's configuration settings, a wireless carrier associated with the electronic device, a manifest of stored software application on the electronic device, and/or additional information associated with the electronic device.

At block 906, it is determined that the query is related to the electronic device. For instance, the computing device 300 can utilize the detection module 322 to determine that the query 318 is an implicit device query. In some examples, the computing device 300 can utilize the detection module 322 to determine that the query 318 is a semi-implicit device query based on the query 318 including an indicator phrase. In some examples, the computing device 300 can utilize the detection module 322 to determine that the query 318 is a fully implicit device query based on identifying query pairs using the query pair database 334.

At 908, a search strategy that is based at least in part on the query and the data associated with the electronic device is determined. For instance, the computing device 300 can determine a search query for the query 318 when the computing device 300 determines that the query 318 is related to the electronic device. In some examples, the search strategy can include generating a new query 3336 using the query 318 and the device data 320. In some examples, the search strategy can include performing a search using the query 318 by incorporating the device data 320 into the search.

At 910, a search is performed using the search strategy. For instance, in some examples, the computing device 300 can perform a search using the new query 336. In such examples, the computing device 300 can retrieve search results that are related to the new query 336. Additionally or alternatively, in some examples, the computing device 300 can perform a search using the query 318 in order to retrieve search results that are related to the query 318. In such examples, the computing device 300 can then re-rank the search results using the device data 320 in order to identify search results that are relevant to the electronic device. For instance, the computing device 300 can use the device data 320 to re-rank search results (e.g., web pages) based on how frequently the search results are selected by electronic devise that are similar to the electronic device. In some examples, the similar electronic devices include the same model as the electronic device, operating platform as the electronic device, configuration setting as the electronic device, wireless carrier as the electronic device, and/or installed software applications as the electronic device.

At 912, the search results are sent. For instance, the computing device 300 can send the search results to the electronic device, such as the client computing device 120 from FIG. 1. The electronic device can then provide the search results to a user. For instance, the electronic device can display the search results via a display device and/or output the search results via one or more microphones.

Example Clauses

Paragraph A: A system comprising: one or more processors; and one or more computer-readable media storing computer-executable instructions that, when executed by the one or more processors, cause the one or more processors to perform acts comprising: receiving a query from an electronic device; receiving, from the electronic device, data associated with the electronic device; determining that the query is related to the electronic device; generating a new query based at least in part on the query and the data associated with the electronic device; retrieving results related to the new query; and sending, to the electronic device, the results related to the new query.

Paragraph B: A system as paragraph A recites, wherein the data associated with the electronic device includes at least one of: a model name of the electronic device, an operating platform of the electronic device, a configuration setting associated with the electronic device, a wireless carrier associated with the electronic device, or a manifest of stored software applications.

Paragraph C: A system as Paragraph A or Paragraph B recites, wherein determining that the query is related to the electronic device comprises at least one of: determining that the query is a semi-implicit device query; or determining that the query is a fully implicit device query.

Paragraph D: A system as any of Paragraphs A-C recite, the acts further comprising: identifying that the query includes an indicator phrase associated with the electronic device, and wherein determining that the query is related to the electronic device includes determining, based at least in part on the query including the indicatory phrase, that the query is a semi-implicit device query.

Paragraph E: A system as Paragraph D recites, wherein the data includes information associated with the electronic device, and wherein generating the new query includes replacing the indicator phrase within query with the information associated with the electronic device.

Paragraph F: A system as any of Paragraphs A-E recite, the acts further comprising: searching a database using the query, wherein the database includes a plurality of implicit device related queries; and determining that the query is similar to at least one query from the database; and wherein determining that the query is related to the electronic device includes determining, based least in part on determining that the query is similar to the at least one query, that the query is a fully implicit device query.

Paragraph G: A system as any of Paragraphs A-F recite, wherein the data includes information associated with the electronic device, and wherein generating the new query includes adding the information to the query.

Paragraph H: A method comprising: receiving a query from an electronic device; determining that the query is related to the electronic device; based at least in part on determining that the query being related to the electronic device, determining a search strategy that is based at least in part on the query and data associated with the electronic device; performing a search using the search strategy; and sending search results associated the search to the electronic device.

Paragraph I: A method as Paragraph H recites, wherein the data associated with the electronic device includes at least one of: a model name of the electronic device, an operating platform of the electronic device, a configuration setting associated with the electronic device, a wireless carrier associated with the electronic device, or a manifest of stored software applications.

Paragraph J: A method as Paragraph H or Paragraph I recites, wherein performing the search using the search strategy comprises: generating a new query based at least in part on the query and the data associated with the electronic device; and retrieving the search results using the new query, wherein the search results are relevant to the electronic device.

Paragraph K: A method as Paragraph J recites, wherein the data includes information associated with the electronic device, and wherein generating the new query includes replacing an indicator phrase within the query with the information associated with the electronic device.

Paragraph L: A method as Paragraph J recites, wherein the data includes information associated with the electronic device, and wherein generating the new query includes adding the information associated with the electronic device to the query.

Paragraph M: A method as any of Paragraphs H-L recite, wherein performing the search using the search strategy comprises at least one of: ranking initial search results that are related to the query; re-ranking the initial results based at least in part on the data associated with the electronic device; re-ranking the initial results based at least in part on the data associated with the electronic device and an analysis of content within the initial search results; generating a new query based on the query and retrieving new search results related to the new query; or merging the initial search results and the new search results.

Paragraph N: A method as any of Paragraphs H-M recite, wherein determining that the query is related to the electronic device comprises at least one of: identifying that the query includes an indicator phrase associated with the electronic device; or determining that the query is similar to at least one query included in a query database, wherein the database includes a plurality of implicit device related queries.

Paragraph O: A method as any of Paragraphs H-N recite, wherein the query is a semi-implicit device query or a fully implicit device query.

Paragraph P: One or more computer-readable media storing instructions that, when executed on one or more processors, cause the one or more processor to perform operations comprising: receiving a query; determining that the query is related to an electronic device; generating a new query by performing at least one of: replacing a portion of the query with information related to the electronic device; or adding the information related to the electronic device to the query; and performing a search using the new query.

Paragraph Q: One or more computer-readable media as Paragraph P recites, wherein the information related to the electronic device includes at least one of: a model name of the electronic device, an operating platform of the electronic device, a configuration setting associated with the electronic device, a wireless carrier associated with the electronic device, or a manifest of stored software applications.

Paragraph R: One or more computer-readable media as Paragraph P or Paragraph Q recites, wherein the query is received from the electronic device, and wherein the operations further comprise: receiving, from the electronic device, data associated with the electronic device, the data including the information related to the electronic device; retrieving, based at least in part on performing the search, search results related to the new query; and sending, to the electronic device, the search results.

Paragraph S: One or more computer-readable media as any of Paragraphs P-R recite, wherein performing the search using the new query comprises: sending the new query to a server; receiving, from the server, search results related to the new query; and causing a display of the search results.

Paragraph T: One or more computer-readable media as any of Paragraphs P-S recite, wherein determining that the query is related to the electronic device comprises at least one of: determining that the query is a semi-implicit device query; or determining that the query is a fully implicit device query.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, 300, and/or 400 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing computer-executable instructions that, when executed by the one or more processors, cause the one or more processors to perform acts comprising:
receiving a query from an electronic device, the query comprising an indicator phrase that indicates that the query relates to the electronic device from which the query is received, without providing any information about a model or operating platform of the electronic device;
receiving, from the electronic device, data associated with the electronic device, the data comprising at least one of a model name or a name of the operating platform of the electronic device;
determining, based on the indicator phrase included in the query, that the query is related to the electronic device from which the query is received;
generating a new query based at least in part on the query and the data associated with the electronic device at least by replacing the indicator phrase within the query with at least one of the model name or the name of the operating platform of the electronic device;
retrieving results related to the new query; and
sending, to the electronic device, the results related to the new query.

2. The system of claim 1, wherein the data associated with the electronic device further includes at least one of:
a configuration setting associated with the electronic device,
a network associated with the electronic device,
a manifest of stored software applications, or
a physical characteristic of the electronic device.

3. The system of claim 1, wherein determining that the query is related to the electronic device includes determining, based at least in part on the query including the indicatory phrase, that the query is a semi-implicit device query.

4. The system of claim 1, wherein the data includes further information associated with the electronic device, and wherein generating the new query includes adding the further information to the query.

5. A method comprising:
- receiving a fully implicit device query from an electronic device;
- receiving, from the electronic device, device data associated with the electronic device, the data comprising at least one of a model name or a name of an operating platform of the electronic device;
- determining whether the received query is at least similar to a query listed in a query pair database that stores pairs of previously received successive queries, one of the queries in each pair being a non-implicit device query including an indicator phrase or explicit device mention and the other one of the queries in that pair being an implicit device query not including an indicator phrase or explicit device mention;
- determining, based on at least similarity of the received query to an implicit device query listed in the query pair database that does not include an indicator phrase or explicit device mention, that the received query is related to the electronic device from which it was received;
- based at least in part on determining that the received query is related to the electronic device, determining a search strategy that is based at least in part on the received query and the data associated with the electronic device, the search strategy comprising reformulating the query by adding at least a portion of the device data;
- performing a search using the search strategy, including the reformulated search query; and
- sending search results associated with the search to the electronic device.

6. The method of claim 5, wherein the device data associated with the electronic device includes at least one of:
- a model name of the electronic device,
- an operating platform of the electronic device,
- a configuration setting associated with the electronic device,
- a network associated with the electronic device,
- a manifest of stored software applications, or
- a physical characteristic of the electronic device.

7. The method of claim 5, wherein the data includes further information associated with the electronic device, and wherein reformulating the query includes adding the further information associated with the electronic device to the query.

8. The method of claim 5, wherein performing the search using the search strategy further comprises at least one of:
- re-ranking initial results based at least in part on the data associated with the electronic device; or
- re-ranking the initial results based at least in part on the data associated with the electronic device and an analysis of content within the initial search results.

9. The method of claim 5, wherein performing the search using the search strategy comprises:
- generating a reformulated query based at least in part on the received query and first data associated with the electronic device;
- performing a first search using the reformulated query in order to retrieve first search results related to the electronic device;
- generating a second reformulated query based at least in part on the received query and second data associated with the electronic device;
- performing a second search using the second reformulated query in order to retrieve second search results related to the electronic device; and
- identifying the search results based at least in part on the first search results and the second search results.

10. The method of claim 5, wherein performing the search using the search strategy comprises:
- performing a first search using the received query in order to retrieve initial search results;
- performing a second search using the reformulated query in order to retrieve additional search results; and
- identifying the search results based at least in part on the initial search results and the additional search results.

11. One or more non-transitory computer-readable media storing instructions that, when executed on one or more processors, cause the one or more processor to perform operations comprising:
- receiving a fully implicit device query from an electronic device;
- receiving, from the electronic device, device data associated with the electronic device;
- determining whether the received query is at least similar to a query listed in a query pair database that stores pairs of previously received successive queries, one of the queries in each pair being a non-implicit device query including an indicator phrase or explicit device mention and the other one of the queries in that pair being an implicit device query not including an indicator phrase or explicit device mention;
- determining, based on at least similarity of the received query to an implicit device query listed in the query pair database that does not include an indicator phrase or explicit device mention, that the received query is related to the electronic device from which it was received;
- generating a new query based at least in part on the received query and the data associated with the electronic device by adding at least a portion of the device data to the query; and
- performing a search using the new query.

12. The one or more computer-readable media of claim 11, wherein the device data associated with the electronic device includes at least one of:
- a model name of the electronic device,
- an operating platform of the electronic device,
- a configuration setting associated with the electronic device,
- a network associated with the electronic device,
- a manifest of stored software applications, or
- a physical characteristic of the electronic device.

13. The one or more computer-readable media of claim 11, and wherein the operations further comprise:
- retrieving, based at least in part on performing the search, search results related to the new query; and
- sending, to the electronic device, the search results.

14. The one or more computer-readable media of claim 11, wherein performing the search using the new query comprises:
- sending the new query to a server;
- receiving, from the server, search results related to the new query; and
- causing a display of the search results.

* * * * *